(12) United States Patent
Ma et al.

(10) Patent No.: US 12,253,208 B2
(45) Date of Patent: Mar. 18, 2025

(54) QUICK-RELEASE TABLET PROTECTION STAND SYSTEM

(71) Applicant: Guangdong Shuowei Technology Co., Ltd, Dongguan (CN)

(72) Inventors: Wenhong Ma, Dongguan (CN); Lei Luo, Dongguan (CN); Hui Xia, Dongguan (CN); Lei Liu, Dongguan (CN)

( * ) Notice: Subject to any disclaimer, the term of this patent is extended or adjusted under 35 U.S.C. 154(b) by 0 days.

(21) Appl. No.: 18/927,179

(22) Filed: Oct. 25, 2024

(65) Prior Publication Data
US 2025/0052360 A1 Feb. 13, 2025

(30) Foreign Application Priority Data

Aug. 30, 2024 (CN) .......................... 202422134025.2
Sep. 19, 2024 (CN) .......................... 202422290777.8

(51) Int. Cl.
*F16M 11/04* (2006.01)
*F16M 11/14* (2006.01)

(52) U.S. Cl.
CPC ........... *F16M 11/041* (2013.01); *F16M 11/14* (2013.01)

(58) Field of Classification Search
CPC ...... F16M 11/041; F16M 11/14; F16M 11/00; F16M 11/04; F16M 13/005
USPC ...... 248/121, 122.1, 125.2, 125.9, 130, 144, 248/220.21, 220.22, 221.1, 1, 222.11, 248/222.12, 222.13, 222.51, 222.52, 248/223.41, 224.7, 225.11
See application file for complete search history.

(56) References Cited

U.S. PATENT DOCUMENTS

| | | | |
|---|---|---|---|
| 2010/0219303 A1* | 9/2010 | Matsui | F16M 11/105 248/316.1 |
| 2015/0034778 A1* | 2/2015 | Lin | F16M 11/16 248/124.1 |
| 2015/0050077 A1* | 2/2015 | Huang | F16M 11/2064 403/327 |

* cited by examiner

*Primary Examiner* — Alfred J Wujciak
(74) *Attorney, Agent, or Firm* — Daniel M. Cohn; Howard M. Cohn

(57) ABSTRACT

The present invention discloses a quick-release tablet protection stand system, relating to the field of electronic product accessories. The quick-release tablet protection stand system comprises a quick-release detachable stand, which is movably installed inside the protective case. The quick-release detachable stand consists of a stand top plate and a stand base plate positioned on one side of the top plate. The stand switch is designed with a push-button mechanism for control, which, compared to the conventional press-button design, reduces the risk of accidental activation. This prevents the sudden collapse of the extended stand due to accidental touches and protects the tablet from tipping over or falling and causing damage, making it safer to use. The shock-absorbing stand is connected to the adjustable mechanism through a docking buckle, docking holes, and locking screws, making assembly and disassembly faster. The universal ball head on the multi-scenario base can be connected to dedicated ball-head bases for various scenarios, allowing applications in engines, heavy machinery, aircrafts, yachts, and also in supporting tablets in fields such as photography, supermarkets, and medical care.

10 Claims, 8 Drawing Sheets

QUICK-RELEASE TABLET PROTECTION STAND SYSTEM

TECHNICAL FIELD

The invention relates to the technical field of electronic product accessories, specifically a quick-release tablet protection stand system.

BACKGROUND ART

Tablet fixation structures are used to secure mobile phones or tablets and can adjust the angle of smart devices, making their use more convenient for users. These structures can also be applied to various settings, such as cars, yachts, motorcycles, and bicycles.

However, the current tablet fixation structures often use button switches for control. Pressing a button switch allows for one-touch folding of the stand. However, during actual use, the button is prone to accidental touches, causing the stand in the extended position to suddenly fold or collapse, leading to the tablet tipping over, falling, and being damaged. This presents poor safety and less-than-ideal usability.

SUMMARY OF THE INVENTION

To solve the above problems, this invention provides the following technical solution: a quick-release tablet protection stand system, including a quick-release detachable stand, which is movably installed inside the protective case.

The quick-release detachable stand includes a stand top plate and a stand base plate positioned on one side of the stand top plate. One side of the stand top plate is equipped with a storage slot, with positioning holes on both sides of one end of the slot and sliding slots on both sides of the other end. Inside the storage slot, there is a movably installed auxiliary support plate and a support plate positioned on one side of the auxiliary support plate.

One end of the auxiliary support plate is movably sleeved with a first rotating shaft that extends into the two positioning holes. The other end is movably sleeved with a second rotating shaft, and a torsion spring is movably sleeved on the first rotating shaft.

The middle of one side of the support plate is equipped with a shaft hole that movably connects to the second rotating shaft, and one end of the support plate is movably sleeved with a third rotating shaft, which extends into the two sliding slots.

A stand switch is movably installed inside the stand top plate at one end of one of the sliding slots. One side of the stand switch has a locking block extending into the sliding slot. Adjacent to the locking block, the stand switch has a push-button extending to one side of the stand top plate. On the opposite side of the locking block, the stand switch is equipped with a first return spring.

To flip open the support plate from the end opposite the third rotating shaft, the support plate drives the third rotating shaft to slide inside the sliding slot. At the same time, the support plate drives the auxiliary support plate to flip through the second rotating shaft, compressing the torsion spring. The torsion spring continuously applies a force in the opposite direction to the flip. The third rotating shaft slides and contacts the locking block, causing the locking block to retract and compress the first return spring to avoid obstruction. As the return spring rebounds, it limits the third rotating shaft, thus positioning the support plate and auxiliary support plate in the open position, providing angular support for the protective case.

To store the support plate and auxiliary support plate, the stand switch is triggered by toggling the push-button. The stand switch disengages the locking block from limiting the third rotating shaft, allowing the torsion spring to rebound, causing the auxiliary support plate and the support plate to flip back into the storage slot, achieving one-touch storage.

In a preferred embodiment of this invention, a connecting hole is provided inside the protective case. The stand top plate and the stand base plate are movably connected to both sides of the connecting hole, and they are fixed with screws. One side of the connecting hole is equipped with several toothed grooves, while one side of the stand base plate is fitted with several adjustment teeth that movably engage with the toothed grooves.

In another preferred embodiment of this invention, the end of the support plate distant from the third rotating shaft is provided with a flip groove, and the interior of the support plate is equipped with a flip hole located on one side of the flip groove.

In a further preferred embodiment of this invention, two sheath fixing slots are provided on both sides of the storage slot inside the stand top plate, and one side of the stand top plate is fitted with hand sheaths, with both ends inserted into the two sheath fixing slots.

Another preferred embodiment of this invention includes at least three torsion spring buckle plates on the side of the auxiliary support plate opposite the support plate. One end of the torsion spring is mounted on one side of the auxiliary support plate through the three torsion spring buckle plates, while the other end is movably engaged inside the stand top plate.

In a preferred embodiment of this invention, one side of the stand top plate is equipped with at least four L-shaped docking holes. Inside the storage slot, on one side of the first rotating shaft, a fixed nut is provided.

In another preferred embodiment, the invention further includes a shock-absorbing stand. The shock-absorbing stand consists of a stand connection plate and a cushioning plate. One side of the stand connection plate is equipped with four L-shaped docking buckles, which correspond to the four docking holes. The four docking buckles are movably engaged with the four docking holes.

In another preferred embodiment, the cushioning plate is equipped with at least four circular recessed platforms. Inside these recessed platforms, rubber shock-absorbing sleeves are movably installed, with fixed rods movably installed inside the rubber shock-absorbing sleeves. One end of each fixed rod is fixedly connected to one side of the stand connection plate, and a conical spring is movably sleeved over the section of the fixed rod located between the stand connection plate and the cushioning plate.

In a further preferred embodiment, the stand connection plate is movably sleeved with a locking screw located on one side of the cushioning plate. One end of the locking screw is screwed into the fixed nut to lock the relative position of the stand top plate and the stand connection plate. The end of the locking screw opposite the fixed nut is equipped with a locking handle, and a second return spring is sleeved around the exterior of the locking screw near the locking handle.

In another preferred embodiment, the invention also includes a multi-scenario base universal ball head used to connect with various scenario-specific stands. The multi-scenario base universal ball head is fixed in the middle of one side of the cushioning plate via a long screw.

Compared with the prior art, the invention provides a quick-release tablet protection stand system with the following advantages:

1. This quick-release tablet protection stand system features a push-button controlled stand switch design. Compared to the conventional press-button design, the push-button reduces the chance of accidental touches. This prevents the stand from suddenly collapsing when in the extended position, avoiding the risk of the tablet tipping over, falling, and getting damaged, making the system safer to use. The shock-absorbing stand is connected to the adjustable mechanism through docking buckles, docking holes, and locking screws, enabling faster assembly and disassembly. The multi-scenario base universal ball head allows for connection to specialized stands for different scenarios, making it applicable for use on engines, heavy machinery, aircrafts, yachts, and also in photography, supermarkets, and medical fields for tablet support.

2. The shock-absorbing stand in the quick-release tablet protection stand system can be connected to various scenario-specific base ball heads for different applications. The cushioning plate is connected to the stand connection plate via rubber shock-absorbing sleeves and conical springs, effectively buffering vibrations and greatly reducing the transmission of vibrations to the stand connection plate and the stand top plate. Thus the risk of damage to the tablet from vibrations is significantly reduced.

Legend for the Figures: 1. quick-release detachable stand; 11. stand top plate; 111. sheath fixing slot; 12. stand base plate; 121. adjustment teeth; 13. storage slot; 131. positioning hole; 132. sliding slot; 133. fixed nut; 14. auxiliary support plate; 141. first rotating shaft; 142. second rotating shaft; 143. torsion spring buckle plate; 15. support plate; 151. shaft hole; 152. third rotating shaft; 153. flip groove; 154. flip hole; 16. hand sheath; 17. docking hole; 18. stand switch; 181. locking block; 182. push-button; 183. first return spring; 19. torsion spring; 2. protective case; 21. connection hole; 22. toothed groove; 3. shock-absorbing stand; 31. stand connection plate; 32. cushioning plate; 321. circular recessed platform; 33. multi-scenario base universal ball head; 331. long screw; 34. rubber shock-absorbing sleeve; 35. fixed rod; 36. conical spring; 37. docking buckle; 38. locking screw; 391. locking handle; 39. second return spring.

DETAILED IMPLEMENTATION METHOD

The following will clearly and fully describe the technical solutions in the embodiments of the present invention in conjunction with the accompanying drawings. It is evident that the described embodiments are only a part of the embodiments of the invention, not all of them. Based on the embodiments of the present invention, all other embodiments obtained by those skilled in the art without creative efforts fall within the scope of protection of the invention.

Figure 1:
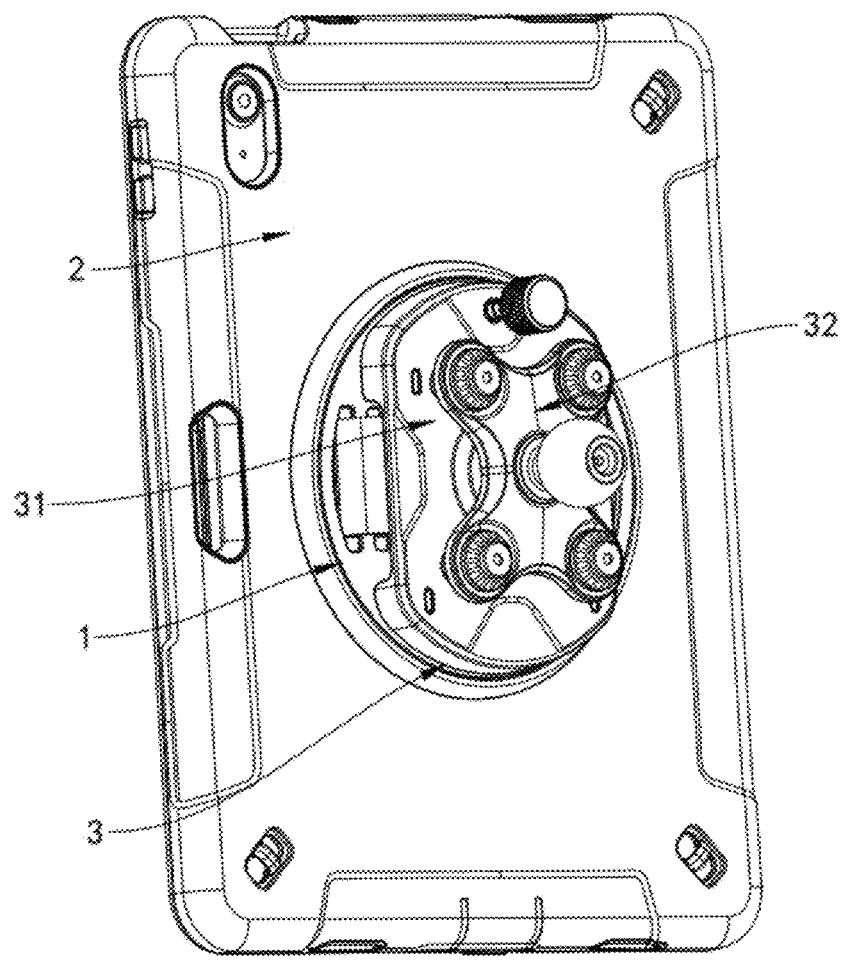
FIG. 1: A structural diagram of the quick-release tablet protection stand system proposed by the present invention.
Figure 2:
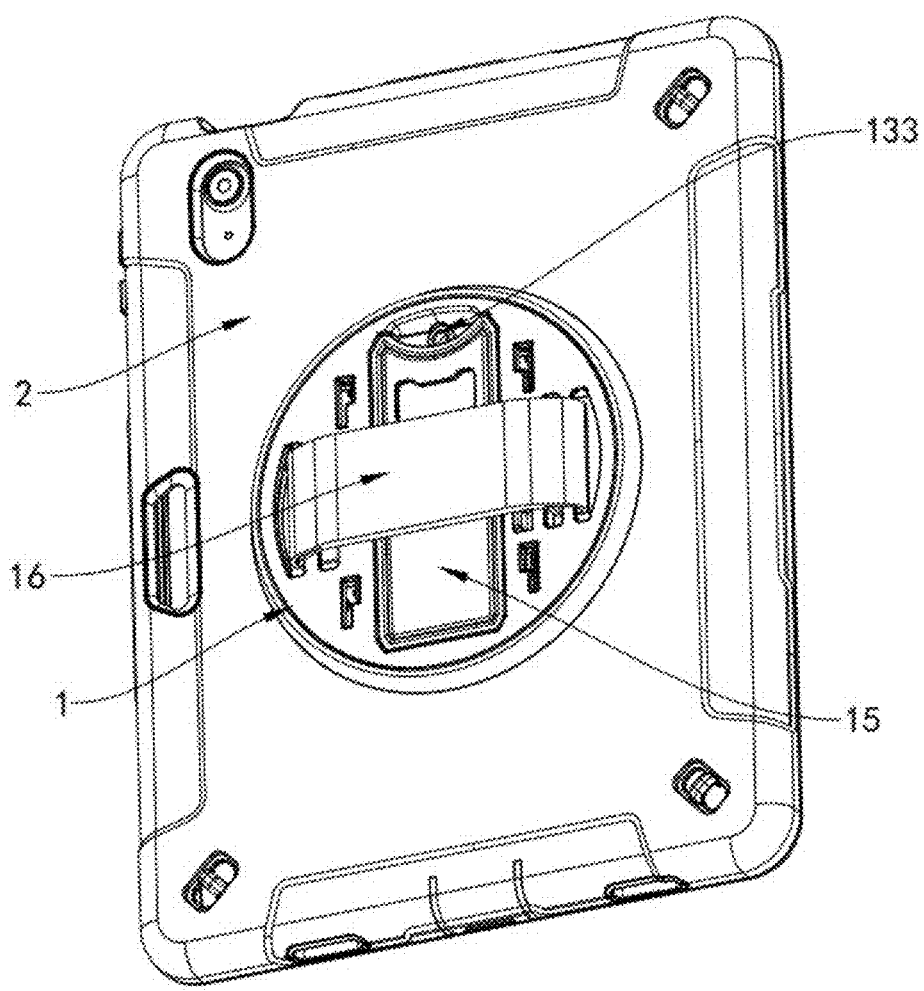
FIG. 2: A structural diagram of the quick-release detachable stand in the system proposed by the present invention.
Figure 3:
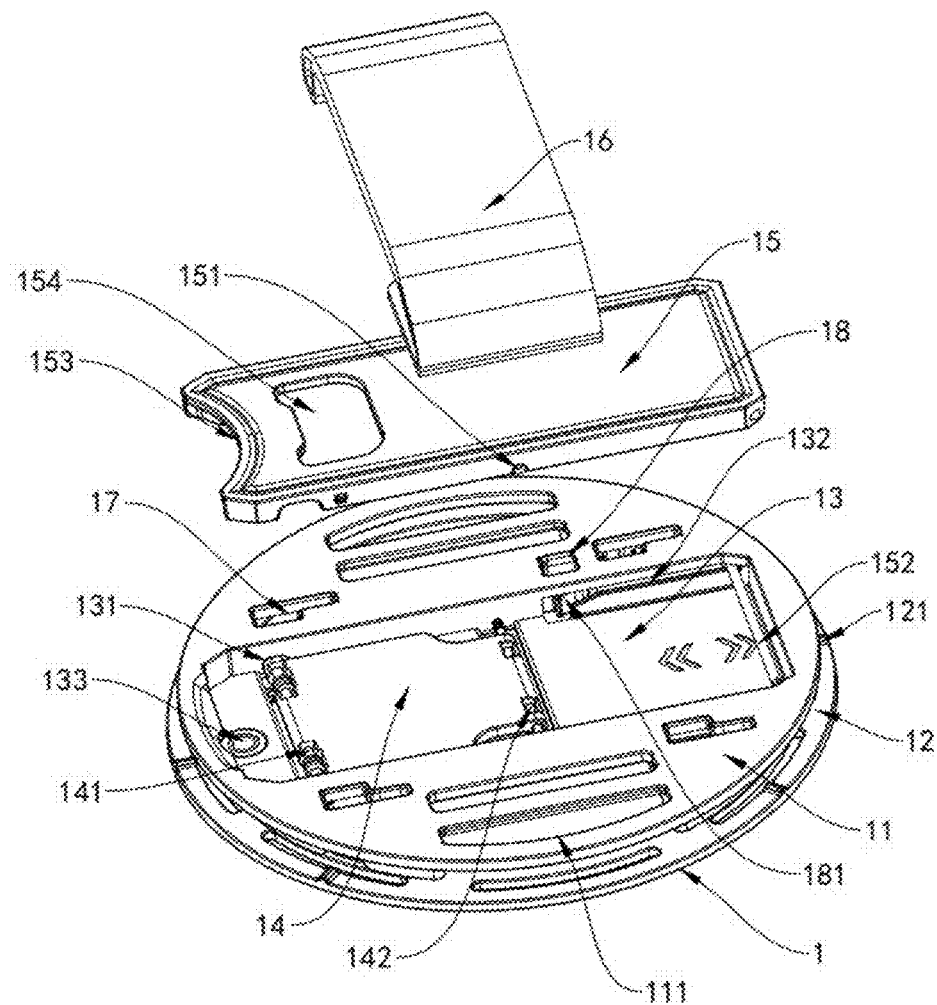
FIG. 3: A structural diagram of the storage slot in the system proposed by the present invention.
Figure 4:
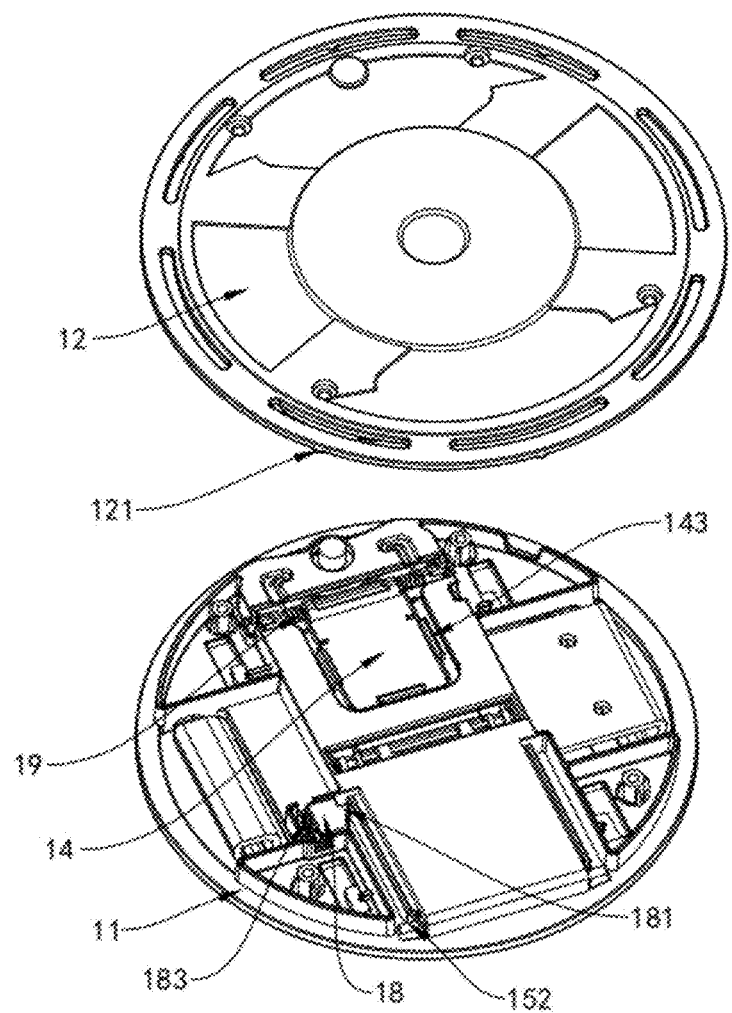
FIG. 4: A structural diagram of the stand top plate in the system proposed by the present invention.
Figure 5:
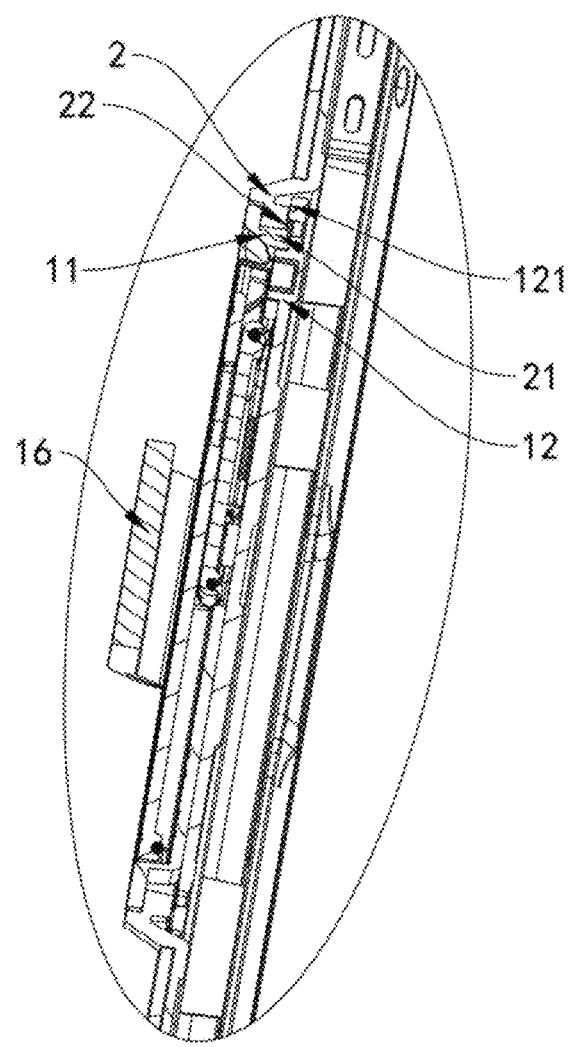
FIG. 5: A sectional view of the connection hole in the system proposed by the present invention.
Figure 6:
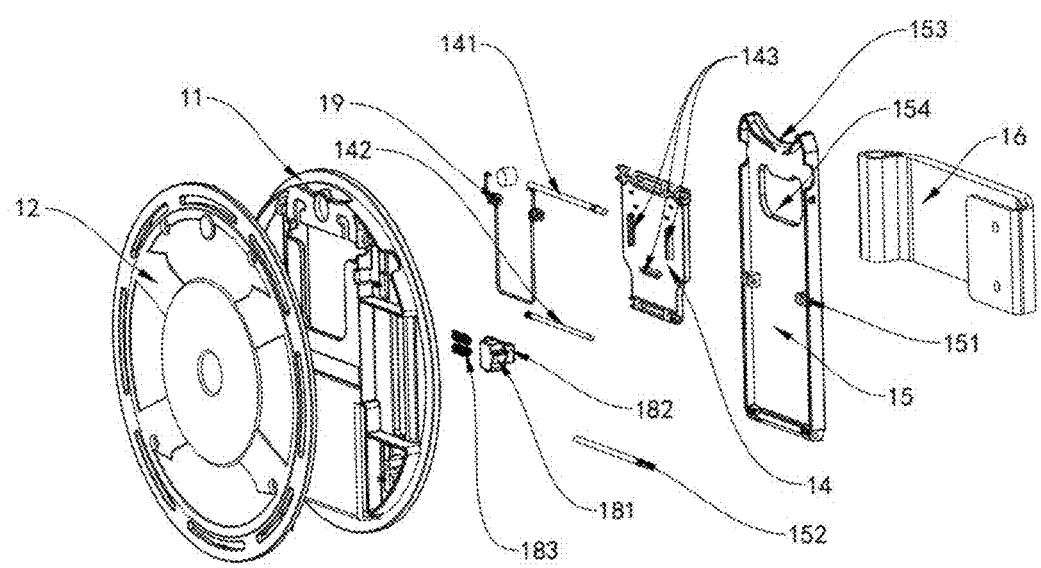
FIG. 6: An exploded view of the quick-release detachable stand in the system proposed by the present invention.
Figure 7:
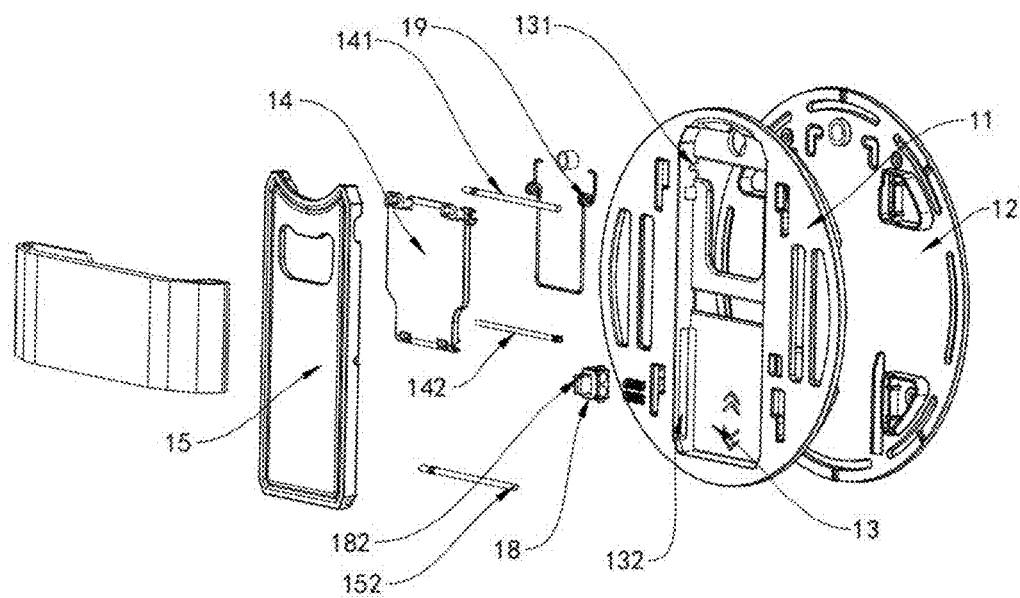
FIG. 7: Another exploded view of the quick-release detachable stand in the system proposed by the present invention.
Figure 8:
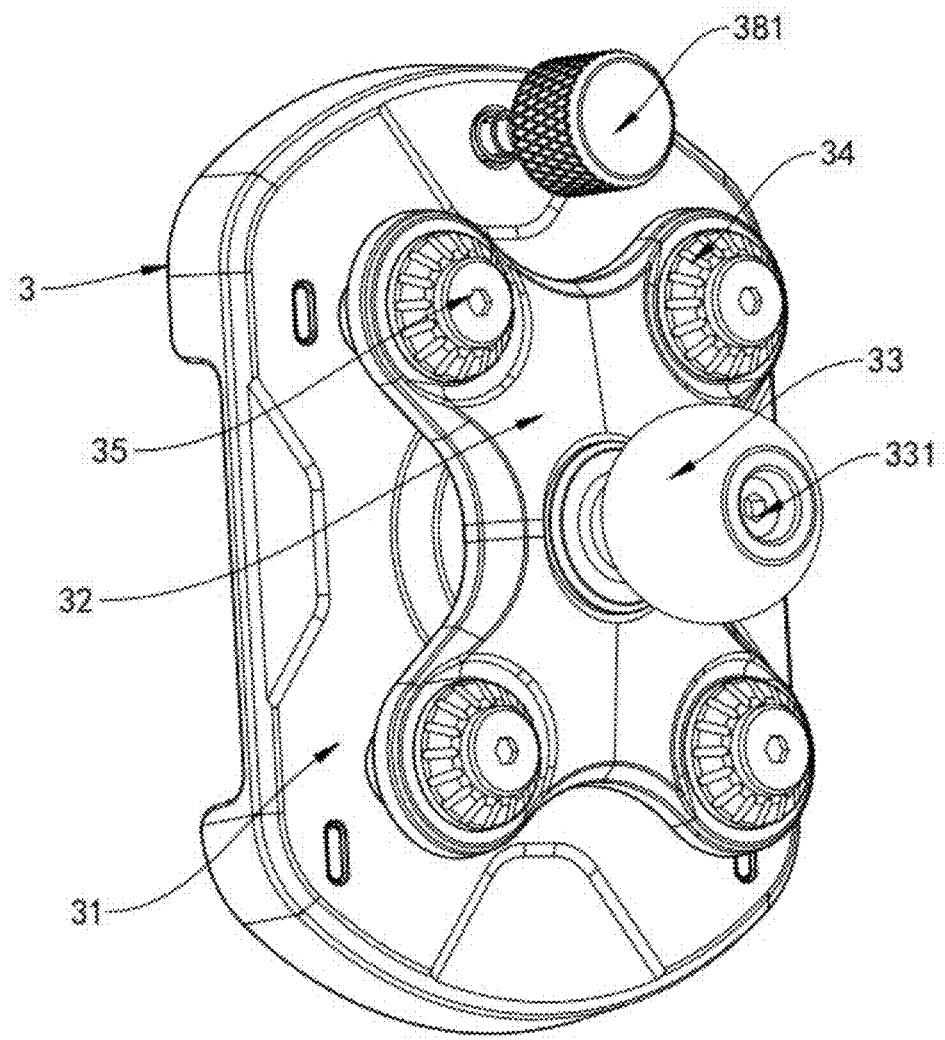
FIG. 8: A structural diagram of the shock-absorbing stand in the system proposed by the present invention.
Figure 9:
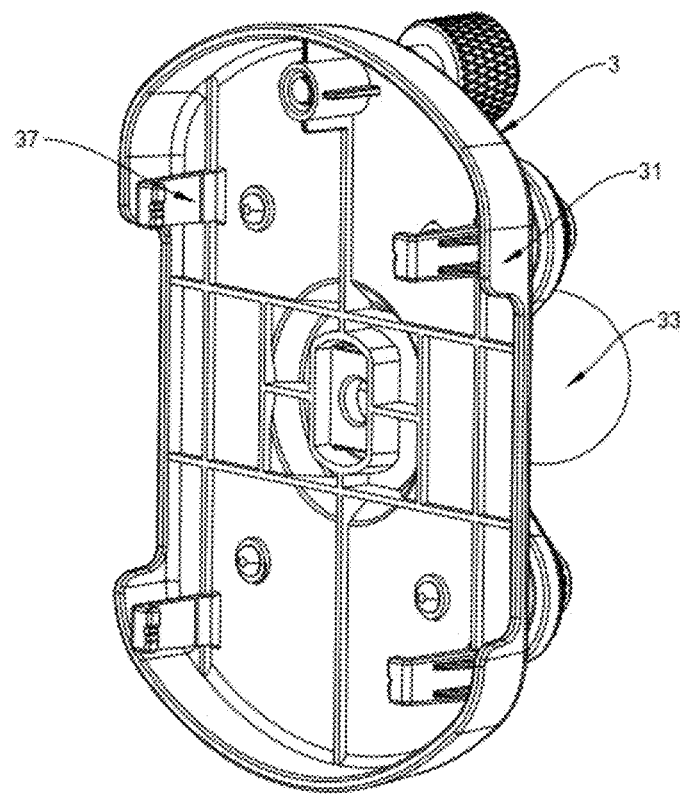
FIG. 9: A side view of the shock-absorbing stand in the system proposed by the present invention.
Figure 10:
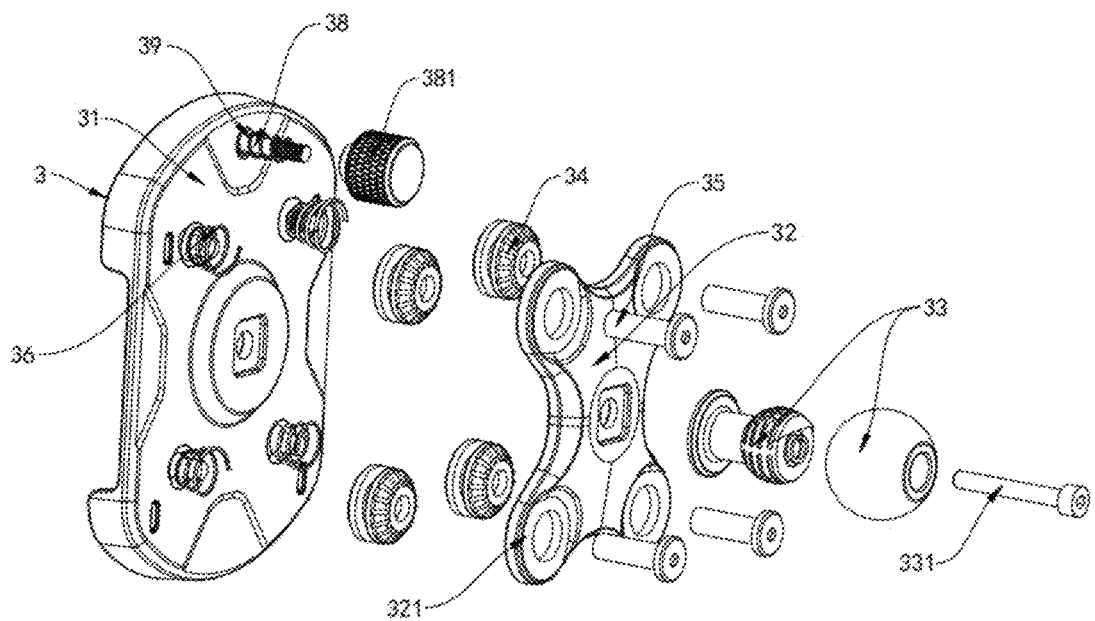
FIG. 10: An exploded view of the shock-absorbing stand in the system proposed by the present invention.

Please refer to FIGS. 1-10, which show a quick-release tablet protection stand system, including a quick-release detachable stand 1, wherein the quick-release detachable stand 1 is movably installed inside the protective case 2.

The quick-release detachable stand 1 includes a stand top plate 11 and a stand base plate 12 positioned on one side of the stand top plate 11. One side of the stand top plate 11 is provided with a storage slot 13. Both sides of one end of the storage slot 13 are equipped with positioning holes 131, while the other end has sliding slots 132. Inside the storage slot 13, there is a movably installed auxiliary support plate 14 and a support plate 15 positioned on one side of the auxiliary support plate 14.

One end of the auxiliary support plate 14 is movably sleeved with a first rotating shaft 141, with both ends extending into the two positioning holes 131. The other end is sleeved with a second rotating shaft 142, and a torsion spring 19 is movably sleeved on the first rotating shaft 141.

In the middle of one side of the support plate 15, a shaft hole 151 is provided, which is movably sleeved with the second rotating shaft 142. One end of the support plate 15 is movably sleeved with a third rotating shaft 152, with both ends extending into the sliding slots 132.

Inside the stand top plate 11, a stand switch 18 is movably installed at one end of one of the sliding slots 132. One side of the stand switch 18 is provided with a locking block 181, which extends into the sliding slot 132. Adjacent to the locking block 181, the stand switch 18 has a push button 182 that extends to one side of the stand top plate 11. The side of the stand switch 18 opposite the locking block 181 is equipped with a first return spring 183.

When the support plate 15 is flipped from the end opposite the third rotating shaft 152, the support plate 15 drives the third rotating shaft 152 to slide inside the sliding slot 132. At the same time, the support plate 15 drives the auxiliary support plate 14 to flip through the second rotating shaft 142, and the auxiliary support plate compresses the torsion spring 19. The torsion spring 19 continuously applies a force on the auxiliary support plate 14 and the support plate 15 in the opposite direction to the flip. The third rotating shaft 152 slides and contacts the locking block 181, which retracts and compresses the first return spring 183 to avoid interference. As the return spring 183 rebounds, it limits the third rotating shaft 152, thereby positioning the support plate 15 and the auxiliary support plate 14 in the open position, providing angular support to the protective case 2.

To store the support plate 15 and the auxiliary support plate 14, the push button 182 is used to toggle the stand switch 18. The stand switch 18 disengages the locking block 181 from limiting the third rotating shaft 152. The torsion spring 19 rebounds, flipping the auxiliary support plate 14 and support plate 15 back into the storage slot 13, achieving one-touch storage.

In one specific technical solution of this embodiment, the interior of the protective case 2 is provided with a connecting hole 21. The stand top plate 11 and stand base plate 12 are movably connected to both sides of the connecting hole 21, and the stand top plate 11 and the stand base plate 12 are fixed with screws. One side of the connecting hole 21 is equipped with several toothed grooves 22, while one side of the stand base plate 12 is fitted with several adjustment teeth 121. The adjustment teeth 121 engage with the toothed grooves 22, allowing the quick-release detachable stand 1 to rotate 360 degrees, thereby switching between landscape and portrait modes for supporting the tablet.

In another specific technical solution of this embodiment, one end of the support plate 15, distant from the third rotating shaft 152, is provided with a flip groove 153. Inside the support plate 15, a flip hole 154 is located on one side of the flip groove 153. During use, the flip groove 153 allows the support plate 15 to be flipped open. By using the flip hole 154 in conjunction with the flip groove 153, two fingers can be used to pinch and flip the support plate 15, making it more convenient to use.

In yet another specific technical solution, the interior of the stand top plate 11 is equipped with two sheath fixing slots 111 located on both sides of the storage slot 13. One side of the stand top plate 11 is fitted with hand sheaths 16, with both ends inserted into the two sheath fixing slots 111. The middle of the hand sheath 16 is connected via Velcro, allowing it to fit users with different hand sizes. The sheath fixing slots 111 are used to install both ends of the hand sheaths 16. The user can insert their hand into the hand sheath 16, allowing them to hold the protective case 2 more easily, making handheld use more convenient.

In one specific technical solution of this embodiment, the side of the auxiliary support plate 14 opposite the support plate 15 is provided with at least three torsion spring buckle plates 143. One end of the torsion spring 19 is mounted on one side of the auxiliary support plate 14 through the three torsion spring buckle plates 143, and the other end is movably engaged inside the stand top plate 11. The design of the torsion spring buckle plates 143 ensures the stability of one end of the torsion spring 19. The main body of the torsion spring 19 is U-shaped and includes two spiral segments, making the process of flipping the auxiliary support plate 14 and the support plate 15 back to their original positions faster.

In another specific technical solution, one side of the stand top plate 11 is equipped with at least four docking holes 17, which are L-shaped. Inside the storage slot 13, a fixed nut 133 is positioned next to the first rotating shaft 141. The invention also includes a shock-absorbing stand 3, which consists of a stand connection plate 31 and a cushioning plate 32. One side of the stand connection plate 31 is provided with four L-shaped docking buckles 37, corresponding to the four docking holes 17. The four docking buckles 37 are movably engaged with the four docking holes 17. During use, the stand connection plate 31 is positioned opposite the stand top plate 11, and the four docking buckles 37 are aligned with the docking holes 17. The docking buckles 37 are inserted into the docking holes 17 and then the stand connection plate 31 is slid downwards, allowing the docking buckles 37 to further engage inside the L-shaped docking holes 17. At this point, the locking screw 38 is aligned with the fixed nut 133, and by rotating the locking screw 38 into the fixed nut 133, the relative position of the stand connection plate 31 and the stand top plate 11 is secured, ensuring a stable connection between the stand connection plate 31 and the stand top plate 11.

In another specific technical solution, the cushioning plate 32 is provided with at least four circular recessed platforms 321. Inside these recessed platforms 321, rubber shock-absorbing sleeves 34 are movably engaged in the recessed platforms 321, and fixed rods 35 are movably installed inside the rubber shock-absorbing sleeves 34. One end of each fixed rod 35 is fixedly connected to one side of the stand connection plate 31. A conical spring 36 is movably sleeved on the section of the fixed rod 35 located between the stand connection plate 31 and the cushioning plate 32. When the cushioning plate 32 is connected to a multi-scenario base universal ball head 33, vibrations generated during riding are transmitted through the universal ball head 33 to the cushioning plate 32. The cushioning plate 32 compresses the conical spring 36 to absorb the vibrations, which are then significantly reduced before being transmitted to the stand connection plate 31 and the stand top plate 11. This design greatly reduces the risk of damage to the tablet from vibrations. Additionally, the cushioning plate 32 is connected to the fixed rod 35 through the rubber shock-absorbing sleeves 34 rather than directly, meaning the vibrations experienced by the cushioning plate 32 are not directly transmitted to the fixed rod 35. The rubber shock-absorbing sleeves 34 filter out part of the vibrations, further enhancing the shock absorption performance of the shock-absorbing stand 3.

In yet another specific technical solution, the interior of the stand connection plate 31 is movably sleeved with a locking screw 38 located on one side of the cushioning plate 32. One end of the locking screw 38 is screwed into the fixed nut 133 to lock the relative position of the stand top plate 11 and the stand connection plate 31. The end of the locking screw 38 opposite the fixed nut 133 is equipped with a locking handle 381, and a second return spring 39 is sleeved around the exterior of the locking screw 38 at one end with the locking handle 381. The second return spring 39 is designed so that when the user turns the locking handle 381 to engage the locking screw 38 with the fixed nut 133, the locking handle 381 compresses the second return spring 39. The second return spring 39 continuously applies pressure against the locking screw 38 when compressed. This design effectively prevents the locking screw 38 from rotating back and disengaging from the fixed nut 133, ensuring a more stable connection. Additionally, when the user turns the locking handle 381 to disengage the locking screw 38 from the fixed nut 133, the second return spring 39 rebounds and pushes the locking handle 381, allowing the locking screw 38 to quickly disengage. This prevents the locking screw 38 from interfering with the stand top plate 11 during the docking operation between the stand top plate 11 and the stand connection plate 31, avoiding jamming and ensuring a faster and more stable docking process. The surface of the locking screw 38 is equipped with a limiter where it is connected to the stand connection plate 31, preventing the locking screw 38 from disconnecting from the stand connection plate 31 under the rebound force of the second return spring 39.

In this specific technical solution, the system also includes a multi-scenario base universal ball head 33, which is used to connect stands for different scenarios. The multi-scenario base universal ball head 33 is fixed in the middle of one side of the cushioning plate 32 through a long screw 331. The multi-scenario base universal ball head 33 is a universal 1-inch specification available on the market and can be used to connect specialized ball-head stands for different scenarios. This system can be applied in engines, heavy machinery, airplanes, yachts, and also for supporting tablets in fields such as photography, supermarkets, and medical care. Additionally, a ball-head base can be installed on the cushioning plate 32, which can be connected to different ball-heads for various scenarios. The ball-head and base can be used interchangeably.

During use, the tablet is installed inside the protective case 2. The stand connection plate 31 is aligned with the stand top plate 11, and the four docking buckles 37 are aligned with the docking holes 17. The docking buckles 37 are inserted into the docking holes 17, and the stand connection plate 31 is slid downward, allowing the docking buckles 37 to engage further inside the L-shaped docking holes 17. At this point, the locking screw 38 is aligned with the fixed nut 133. The locking screw 38 is rotated and screwed into the fixed nut 133, locking the relative position of the stand connection plate 31 and the stand top plate 11. The multi-scenario base universal ball head 33 can be used to connect specialized ball-head stands for different scenarios, such as engines, heavy machinery, airplanes, yachts, photography, supermarkets, and medical care for tablet support. When the cushioning plate 32 is connected to the base via the multi-scenario base universal ball head 33 during cycling, the vibrations generated during the ride are transmitted to the cushioning plate 32 through the universal ball head 33. The cushioning plate 32 compresses the conical spring 36 to absorb the vibrations, significantly reducing them before transmitting them to the stand connection plate 31 and the stand top plate 11. This design greatly reduces the risk of tablet damage due to vibrations. In addition, the cushioning plate 32 is connected to the fixed rod 35 through the rubber shock-absorbing sleeve 34, rather than directly, ensuring that the vibrations experienced by the cushioning plate 32 are not directly transmitted to the fixed rod 35. The rubber shock-absorbing sleeve 34 filters part of the vibrations, further ensuring the shock absorption effectiveness of the shock-absorbing stand 3.

When using the support plate 15 and the auxiliary support plate 14 for angular support, the shock-absorbing stand 3 is removed, and the support plate 15 is flipped by toggling the flip groove 153. The support plate 15 drives the third rotating shaft 152 to slide inside the sliding slot 132, while the second rotating shaft 142 drives the auxiliary support plate 14 to flip. The auxiliary support plate 14 compresses the torsion spring 19, which continuously applies force on the auxiliary support plate 14 and the support plate 15 in the opposite direction of the flip. As the third rotating shaft 152 flips along with the support plate 15, it contacts the locking block 181, which retracts, compressing the return spring 183 to avoid interference. When the return spring 183 rebounds, it limits the third rotating shaft 152, thereby positioning the support plate 15 and the auxiliary support plate 14 in the open position to provide angular support for the protective case 2.

To store the support plate 15 and the auxiliary support plate 14, the push button 182 toggles the stand switch 18, which disengages the locking block 181 from limiting the third rotating shaft 152. The torsion spring 19 rebounds, flipping the auxiliary support plate 14 and support plate 15 back into the storage slot 13, achieving one-touch storage.

In summary, this quick-release tablet protection stand system uses the push-button 182 controlled design for the stand switch 18. Compared to the conventional press-button design, the push button 182 reduces the likelihood of accidental touches. This prevents the stand from unexpectedly folding due to the accidental touches on the stand switch 18, causing the tablet to tip over and fall, ensuring safer use. The double-spiral design of the torsion spring 19 allows the auxiliary support plate 14 and the support plate 15 to flip back into storage more quickly. The multi-scenario base universal ball head 33 can be connected to specialized ball-head stands for various scenarios, such as engines, heavy machinery, airplanes, yachts, photography, supermarkets, and medical cares, for supporting tablets. The shock-absorbing stand is connected to the adjustable mechanism via the docking buckles, docking holes, and locking screws, making assembly and disassembly quicker and more convenient.

It should be noted that in this document, terms such as "include" or "comprise" or any of their variations are intended to cover non-exclusive inclusions. As such, a process, method, item, or apparatus that includes a set of elements is not limited to just those elements, but may also include other elements that are not explicitly listed, or elements that are inherent to the process, method, item, or apparatus. Without additional limitations, an element defined by the phrase "includes a . . . " does not exclude the possibility that other identical elements may also be present in the process, method, item, or apparatus that includes the element.

Although embodiments of the present invention have been shown and described, it will be understood by those skilled in the art that various changes, modifications, substitutions, and alterations can be made without departing from the principles and spirit of the invention. The scope of the invention is defined by the appended claims and their equivalents.

The invention claimed is:

1. A quick-release tablet protection stand system, comprising a quick-release detachable stand (1), wherein:
    the quick-release detachable stand (1) is movably disposed in a protective case for the tablet (2);
    the quick-release detachable stand (1) includes a stand top plate (11) and a stand base plate (12) disposed on one side of the stand top plate (11);
    one side of the stand top plate (11) is provided with a storage slot (13), two positioning holes (131) in two sides of one end of the storage slot (13) respectively, and two sliding slots (132) in two sides of the other end of the storage slot (13) respectively;
    within the storage slot (13) there are provided with an auxiliary support plate (14) and a support plate (15) on one side of the auxiliary support plate (14), wherein the auxiliary support plate is rotatable supporting the support plate when the support plate is abutting on a substantially planar surface;
    one end of the auxiliary support plate (14) is movably sleeved on a first rotating shaft (141) having two ends extending into the positioning holes (131) respectively, the other end of the auxiliary support plate (14) is movably sleeved on a second rotating shaft (142), and a torsion spring (19) is movably sleeved on the first rotating shaft (141);
    a shaft hole (151) is disposed in a middle of one side of the support plate (15) and movably sleeved on the second rotating shaft (142), and one end of the support plate (15) is movably sleeved on a third rotating shaft (152) having two ends extending into the sliding slots (132) respectively;
    within the stand top plate (11) there is provided with a stand switch (18) at one end of one of the sliding slots (132);
    one side of the stand switch (18) is provided with a locking block (181) having one end extending into one of the sliding slots (132), wherein the stand switch disengage the locking block from the limiting the third rotating shaft to allow the auxiliary support plate and the support plate back in the storage slot;

adjacent to the locking block (181), the stand switch (18) has a push-button (182) extending to one side of the stand top plate (11); and the side of the stand switch (18) opposing the locking block (181) is provided with a first return spring (183).

2. The quick-release tablet protection stand system of claim 1, further comprising a connecting hole (21) in the protective case (2), wherein the stand top plate (11) and stand base plate (12) are movably connected to two sides of the connecting hole (21) respectively, the stand top plate (11) and the stand base plate (12) are fastened together, one side of the connecting hole (21) is provided with a plurality of toothed grooves (22), and one side of the stand base plate (12) is provided with a plurality of adjustment teeth (121) movably engaged with the toothed grooves (22).

3. The quick-release tablet protection stand system of claim 1, wherein one end of the support plate (15) distal the third rotating shaft (152) is provided with a flip groove (153), and within the support plate (15) there is provided with a flip hole (154) in one side of the flip groove (153).

4. The quick-release tablet protection stand system of claim 1, further comprising two sheath fixing slots (111) in two sides of the storage slot (13) within the stand top plate (11) respectively, wherein one side of the stand top plate (11) is provided with a hand sheath (16) having two ends inserted into the sheath fixing slots (111) respectively.

5. The quick-release tablet protection stand system of claim 1, further comprising three torsion spring buckle plates (143) on the side of the auxiliary support plate (14) opposing the support plate (15), wherein one end of the torsion spring (19) is mounted to one side of the auxiliary support plate (14) through the torsion spring buckle plates (143), and the other end of the torsion spring (19) is moveable in the stand top plate (11).

6. The quick-release tablet protection stand system of claim 1, further comprising four L-shaped docking holes (17) in one side of the stand top plate (11), and a fixing nut (133) in the storage slot (13) at one side of the first rotating shaft (141).

7. The quick-release tablet protection stand system of claim 6, further comprising a shock-absorbing stand (3) including a stand connection plate (31), a cushioning plate (32), and four L-shaped docking buckles (37) on one side of the stand connection plate (31), the L-shaped docking buckles (37) being movably engaged with the L-shaped docking holes (17) respectively.

8. The quick-release tablet protection stand system of claim 7, further comprising four circular recessed platforms (321) on the cushioning plate (32), four moveable rubber shock-absorbing sleeves (34) in the circular recessed platforms (321) respectively, four moveable fixed rods (35) in the moveable rubber shock-absorbing sleeves (34) respectively, each moveable fixed rod (35) having one end connected to one side of the stand connection plate (31), and four conical springs (36) each sleeved on a portion of one of the moveable fixed rods (35) between the stand connection plate (31) and the cushioning plate (32).

9. The quick-release tablet protection stand system of claim 7, further comprising a locking screw (38) movably disposed in the stand connection plate (31) at one side of the cushioning plate (32), the locking screw (38) having one end screwed into the fixing nut (133) to fasten the stand top plate (11) and the stand connection plate (31) together, a locking handle (381) at one end of the locking screw (38) opposing the fixing nut (133), and a second return spring (39) sleeved on the locking screw (38) and engaged with one end of the locking handle (381).

10. The quick-release tablet protection stand system of claim 7, further comprising a multi-scenario base universal ball head (33) and a long screw (331) for fastening the multi-scenario base universal ball head (33) in a middle of one side of the cushioning plate (32).

* * * * *